(12) United States Patent
Henneken et al.

(10) Patent No.: US 6,263,273 B1
(45) Date of Patent: Jul. 17, 2001

(54) PROCESS FOR CONTROLLING AN AUTOMATIC TRANSMISSION

(75) Inventors: Markus Henneken, Kressbronn; Friedemann Jauch, Meckenbeuren; Kai-Uwe Herbster, Friedrichshafen; Franz-Josef Schuler; Thomas Mauz, both of Kressbronn, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/326,306

(22) Filed: Jun. 7, 1999

(30) Foreign Application Priority Data

Jun. 12, 1998 (DE) .............................. 198 26 059

(51) Int. Cl.⁷ ................. G06F 7/00; B60T 7/12
(52) U.S. Cl. ................. 701/51; 701/65; 701/71; 701/74; 701/82; 477/176; 477/904
(58) Field of Search ................. 701/51, 62, 67, 701/71, 73, 55, 36, 70, 74, 76, 82, 90, 91, 95; 477/176, 904, 903, 97, 169, 65, 147; 180/197, 241

(56) References Cited

U.S. PATENT DOCUMENTS

| | | | |
|---|---|---|---|
| 4,825,367 | * 4/1989 | Nagaoka et al. | 701/36 |
| 4,896,569 | * 1/1990 | Ito et al. | 477/65 |
| 4,941,096 | * 7/1990 | Ito et al. | 701/55 |
| 5,029,087 | * 7/1991 | Cowan et al. | 701/68 |
| 5,390,116 | * 2/1995 | Hayafume | 701/65 |
| 5,586,953 | * 12/1996 | Abo | 477/47 |
| 5,758,305 | * 5/1998 | Otsubo et al. | 701/71 |
| 6,041,276 | * 3/2000 | John et al. | 701/67 |

OTHER PUBLICATIONS

Japanese Abstract, M–1210, No. 3–255255 A dated Feb. 13, 1992, vol. 16, No. 57.
Japanese Abstract, M–1517, No. 5–203021 A dated Nov. 30, 1993, vol. 17, No. 645.
Welter, Andreas, u.a. "Die Adaptive Getriebesteuerung für BMW–Automobile". In *ATZ—Automobiltechnische Zeitschrift 95*, 1993, 9, S.420–434.
ATZ Automobiltechnische Zeitschrift 94 (1992) "Die Adaptive Getriebesteuerung für die Automatikgetriebe der BMW Fahrzeuge mit Zwölfzylindermotor", by Andreas Welter, Rudolf Kragl, Harald Ender and Harry Martin, pp. 428–438.

* cited by examiner

Primary Examiner—Jacques H. Louis-Jacques
(74) Attorney, Agent, or Firm—Davis & Bujold, P.L.L.C.

(57) ABSTRACT

In a process for control of an automatic transmission (3) in a vehicle, it is proposed to set an electronic transmission control (4) for a driving state low friction value when slip is detected on the input gears of the vehicle or an ACS deceleration is detected. In an ACS deceleration a meter is determined, via an ACS evaluation function, from the actual acceleration of the vehicle or a parameter (e.g., gear speed increase) corresponding to the actual acceleration. When slip occurs, a meter is determined, via a slip evaluation function, from the theoretical/actual comparison of the vehicle acceleration or a parameter (e.g., torque reserve) corresponding to said comparison. In both an ACS deceleration or when a slip occurs, a winter operation mode is then activated when the meter count exceeds a limit value.

12 Claims, 3 Drawing Sheets

PROCESS FOR CONTROLLING AN AUTOMATIC TRANSMISSION

The invention relates to a process for controlling an automatic transmission in a vehicle in which an electronic transmission control sets a drive state of low friction value when slip is detected in the input gears.

BACKGROUND OF THE INVENTION

In automatic transmissions, a driver can activate the corresponding program via an E/S/W (economy/sport/winter) w push-button. In automatic transmissions, having a so-called "intelligent switching program", the selection of the switching point or the step of the winter program is automatic. A process for activating the winter program has been disclosed, e.g., in ATZ Automobiltechnische Zeitschrift 94 (1992), page 432. It is proposed that unauthorized slip be detected from the comparison of driven and non-driven gears. Depending on the result of said examination, a slip index is set. The winter program is activated when within a fixed preset time period, the sum of these values exceeds a preset limit value. In the practice of the process described, there can arise the problem of reaction time lapses. Reaction time lapses are a result of fixed slip index values, which create long periods between the occurrence of the slip and the activation of the winter program.

In view of the above, the problem to be solved by the invention is for the invention to quickly adapt the performance characteristics of the automatic transmission to the outerwinter operation driving conditions. The invention solves the problem by the fact that a driving state is set at a low friction value when either an ABS deceleration or a slip is detected.

If an ABS deceleration state signal is received by the ABS control unit of the electronic transmission control, a meter determines, via an ABS evaluation function, the actual acceleration of the vehicle or a parameter corresponding to an actual acceleration (e.g., gear speed increase). The ABS evaluation function is carried out so that with each value of the actual acceleration of the vehicle, a meter offset will be coordinated via a characteristic line. The meter count results from the actual meter count plus the offset. If the meter count exceeds a limit value, an electronic transmission control activates the winter operation.

In the case of a slip, the meter will make its determination by means of a slip evaluation function from the theoretical/actual comparison of the vehicle acceleration or a parameter corresponding to the theoretical/actual comparison of the vehicle acceleration (e.g. torque reserve). The slip evaluation function is carried out so that with each value of the theoretical/actual comparison of the vehicle acceleration, a meter offset is coordinated via a characteristic line. If the meter count exceeds a limit value, an electronic transmission control activates the winter operation.

SUMMARY OF THE INVENTION

Wherefore, it is an object of the present invention to overcome the aforementioned problems and drawbacks associated with the prior art designs of the process of controlling automatic transmissions.

A further object of the invention is to make a transmission switch quicker to the winter operation mode when there is great divergence between driver's wish (theoretical acceleration) and actual driving behavior (actual acceleration), the latter which results in a high meter offset.

Yet another object of the invention is the activation of the winter operation mode to actively assist in a low friction value ABS deceleration on a subsoil. It is known that in an ABS deceleration, the wheel revolutions cannot be used as sensor signals since they are clocked and because between vehicle wheel and underground, a slip can occur up to 30% before the ABS control unit reopens the wheel brake.

A further object of the invention is the activation of the winter operation mode as activated by the driver via the program selector button.

Yet still another object of the invention is the winter operation mode being activated by one to several drive programs which are dialed according to the inclination of the road (slopes, ascents) thereby allowing the transmission to upshift earlier when driving uphill than when driving downhill. The inclination of the road can be determined, e.g., by any one of the already known processes. The winter operation is therefore activated not only in the case of a detection of a low road friction value. It can also be activated by the signal of an anti-slip control system.

Yet a still further object of the invention consists in the transmission remaining in winter operation mode when the vehicle has been decelerated to a stop thereby allowing the vehicle to start up again in winter operation mode. When the drive state is reset to low friction value and active winter operation mode, the meter count is cyclically decremented. The decrement takes place only above a presettable vehicle speed threshold or one of the parameters corresponding to the vehicle speed (e.g. transmission output speed), such as 10 km/h.

A preferred embodiment is shown in the drawings, by way of example, wherein:

DESCRIPTION OF THE PREFERRED EMBODIMENTS

Figure 1:
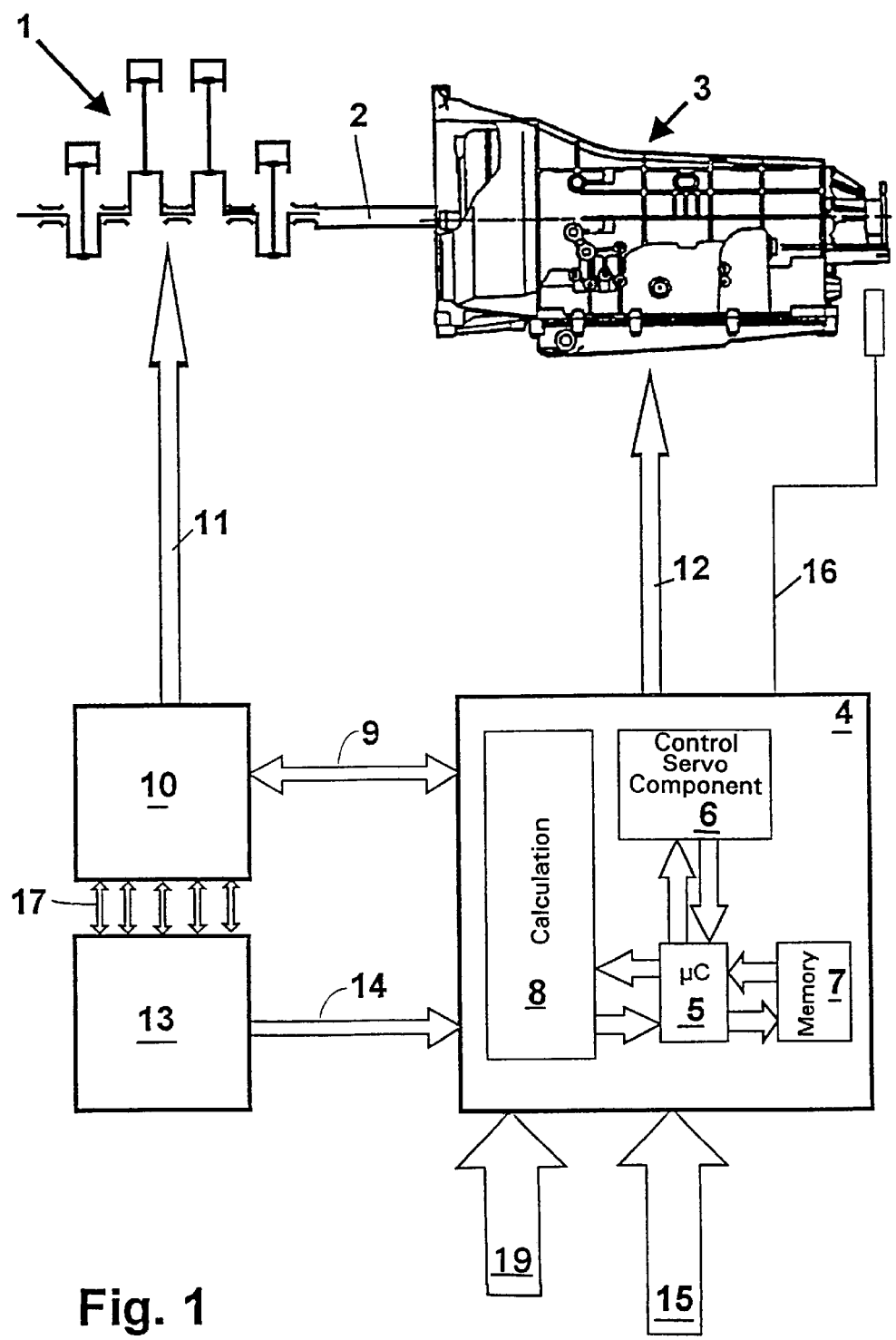
FIG. 1 is a general diagram.

In FIG. 1 is shown a system diagram of an internal combustion engine/automatic transmission unit. It consists of the internal combustion engine 1, the automatic transmission 3, an electronic transmission control 4, an electronic motor control unit 10, which controls the internal combustion engine 1, via control lines 11 and an ABS control unit 13. The electronic transmission control 4, the electronic motor control unit 10 and the ABS control unit 13 are interconnected by data lines 9, 14 and 17. Over said data lines the control units communicate, e.g., by means of CAN bus. On said data lines, e.g., the electronic motor control unit 10 prepares the following information: torque of the internal combustion engine, speed of the internal combustion engine, temperature of the coolant liquid of the internal combustion engine, etc. The electronic transmission control 4 makes available information to the data lines 9, e.g., the beginning and end of a gear shift, the so-called motor engagement, or a theoretical motor torque, etc. The electronic transmission control 4 receives via the data line 14 the signal "ABS active."

The electronic transmission control 4 selects, according to the input parameters 15, a corresponding drive step or a gear shift program. By way of an hydraulic control unit, which is integral part of the automatic transmission 3 and in which are situated electromagnetic servo components, the electronic transmission control 4 activates, via control line 12, a corresponding clutch/brake combination. As blocks of the electronic transmission control 4 are shown, in extensively simplified form, micro-controller 5, memory 7, function block control servo component 6 and function block calculation 8. In the memory 7 are deposited the data relevant to the transmission. Data relevant to the transmission are, e.g., programs, switch characteristic lines, characteristic fields and specific characteristics of the vehicle, the same as diagnosis data. The memory 7 is usually designed as EPROM, EEPROM or as buffered RAM. In the function block calculation 8 are calculated the data relevant for the operation of the automatic transmission 4, such as the pressure level, driving activity, etc. The function block control servo component 6 serves for control of the servo components placed in the hydraulic control unit. The electronic transmission control 4 receives, as additional input parameters, the signal of the transmission output speed 16.

Figure 2:
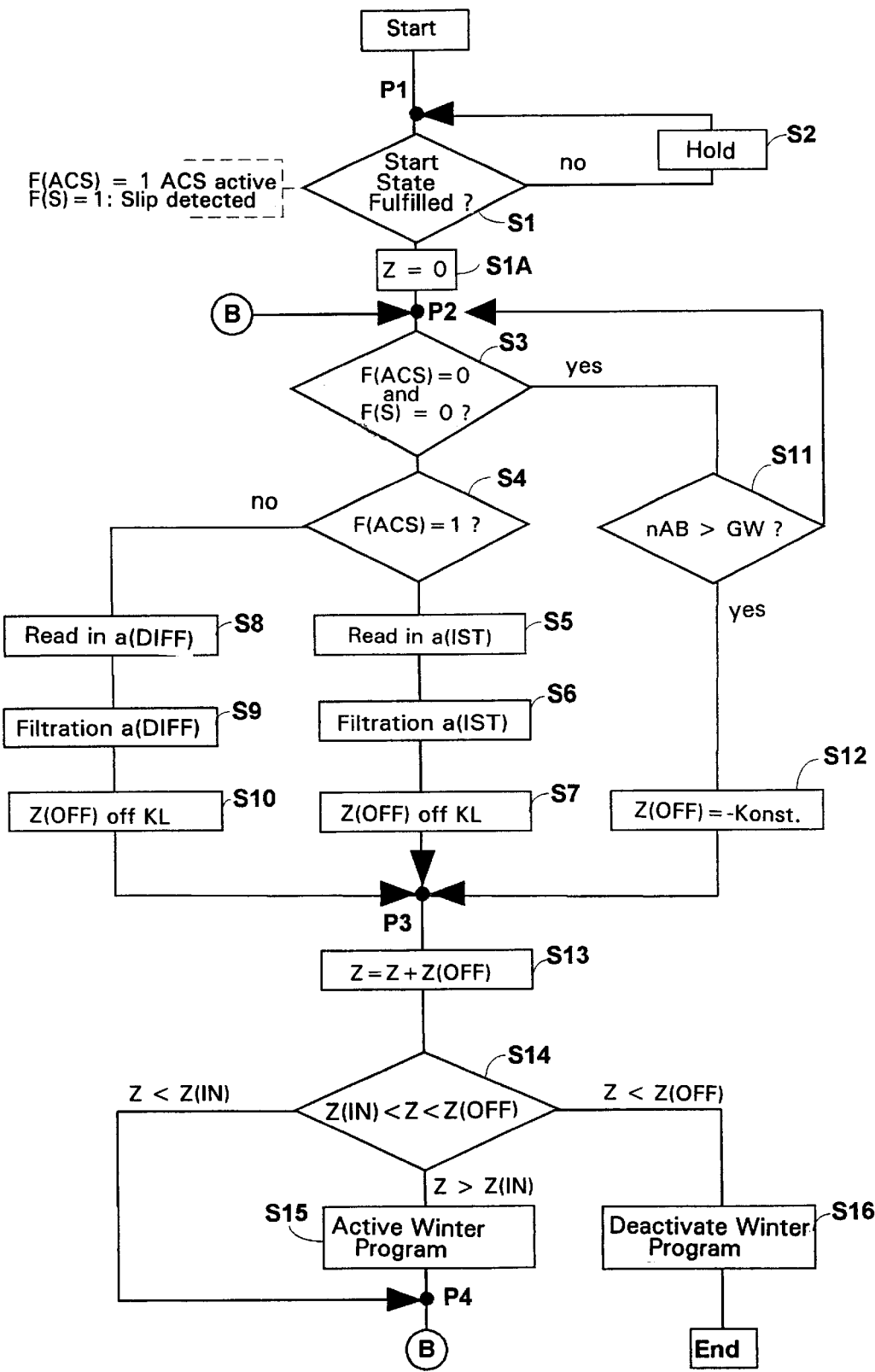
FIG. 2 is a program flow chart.

In FIG. 2 is shown a program flow chart of the process, according to the invention. This partial program will only be run through when the vehicle speed is less than a limit value such as 120 km/h. The program flow chart begins in step S1 with the question whether a start condition has been fulfilled. This start condition is fulfilled when either an ABS deceleration exists (ACS active) or slip is detected. When an ABS deceleration is present, the corresponding flag is set: F(ACS)=1. If slip is detected, the corresponding flag is also set here: F(S)=1. In case of a negative result, i.e., the start condition has not been fulfilled, then step S2 is run through a holding pattern which ends in point P1. In case of a positive result, step S3 is then tested as to whether the ABS flag and the slip flag are zero. In case of a negative result, the state of the ABS flag is tested in step S4. In the presence of an ABS deceleration the steps S5 to S7 are run through. In step S5, the actual acceleration a(IST) is read in. The actual acceleration of the vehicle a(IST) is usually calculated from the transmission output speed 16 of the automatic transmission 3. In step S6, the actual acceleration is filtered, e.g., by forming from ten measured values the arithmetical mean value. In step S7, the meter offset Z(OFF) is determined from a characteristic line. The characteristic line can be seen in FIG. 3 and is explained in combination therewith. In case of a negative result in step S4, i.e., slip exists, the steps S8 to S10 are run through. In step S8, the difference acceleration a(DIFF) is read in. The difference acceleration a(DIFF) constitutes the divergence from actual to theoretical acceleration. In other words, the difference acceleration a(DIFF) indicates to what extent the driver's wish (theoretical acceleration) differs from the actual characteristic of the vehicle (actual acceleration). In step S9, the difference acceleration a(DIFF) is filtered. This is done, e.g., by interlinking ten measured values by arithmetical mean value formation. In step S10, the meter offset Z(OFF) is determined from the characteristic line of FIG. 3. Thereafter the program flow chart goes on at point P3. In step S13 the actual meter count Z is added to the meter offset Z(OFF) calculated in step S10 or S7. Step S14 is tested to find the range of the actual meter count. If the meter count Z is less than a switch in threshold value Z(IN), the program flow chart continues at point P4 and branches to the program part B, i.e., the step to point P2. If the meter count Z is over the switch threshold Z(IN), the activation of the winter operation mode follows with step S15. Thereafter the program is continued with point B, as explained before. If the meter count Z is less than a switch off threshold Z(OFF), the winter operation mode is deactivated, step S16, and return to the main program follows. If in step S3 it is detected that the ABS flag and the slip flag are both zero, then the program branches to step S11. Step S11 is tested as to whether the speed of the vehicle is above a limit value such as 150 1/min. If this is not the case, the program flow chart branches to point P2 and repeats the question S3. In the case of a positive result, a negative meter offset Z(FF) is established in step S12. The program then branches via point P3 to step S13. The loops S11 and S12 cause the meter count to be decremented and consequently the winter operation mode is deactivated.

Additionally, the winter operation can be activated and deactivated by the driver actuating a program selector button 19.

Figure 3:
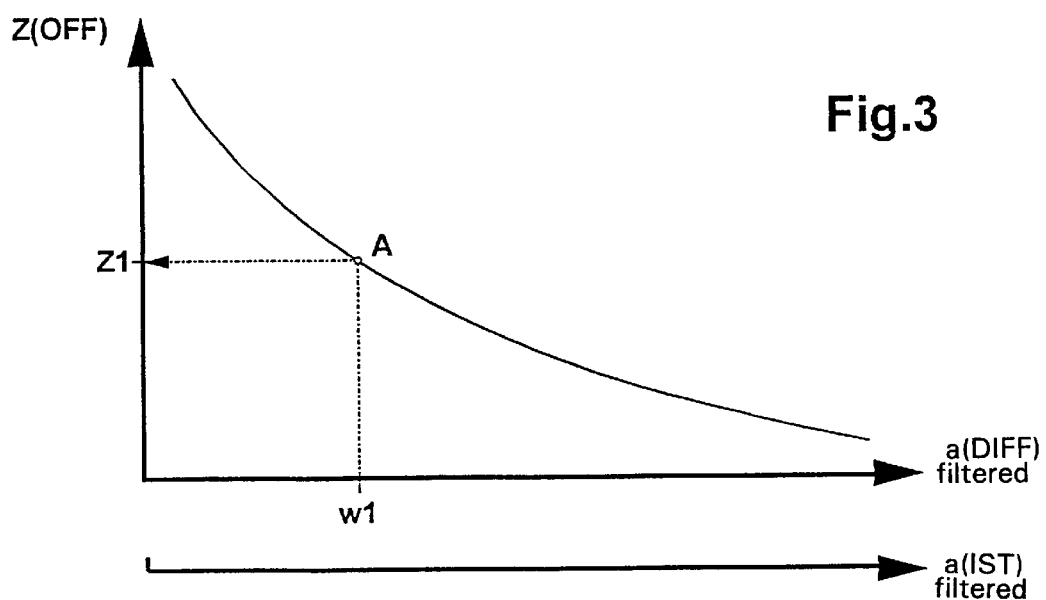
FIG. 3 is a characteristic line for the meter offset.

In FIG. 3 is shown a characteristic line. On the ordinate is shown the output value of the characteristic line of the meter offset Z(OFF). On a first abscissa is shown the filtered value of the difference acceleration a(DIFF). The filtered actual acceleration value a(IST) is shown on a second abscissa. A value W1 is plotted as an example on the first abscissa. The meter offset Z1 results as the output value, via the hyperbola-shaped characteristic line and operating point A.

| Reference numerals |
|---|
| 1 internal combustion engine |
| 2 input shaft |
| 3 automatic transmission |
| 4 electronic transmission control |
| 5 micro-controller |
| 6 function block control servo component |
| 7 memory |
| 8 function block calculation |
| 9 data line |
| 10 electronic motor control unit |
| 11 control line |
| 12 control line |
| 13 ACS control unit |
| 14 data line |
| 15 input parameters |
| 16 transmission output speed |
| 17 data line |
| S1, S2 steps |
| S3, S4 logic question |
| S11, S14 logic question |
| S5 to S10 steps |
| S12, S13 steps |
| S15 step |

What is claimed is:

1. A process for controlling an automatic transmission of a vehicle by an electronic transmission control (4), the process comprising the steps of:

setting a low road friction drive state for the automatic transmission upon detection of one of slip between driven and non-driven gears of the vehicle and active ABS deceleration (ABS=1);

determining a value by one of:
evaluating an active ABS deceleration function (S5 to S7), from one of an actual acceleration of the vehicle and a parameter (e.g., gear speed increase) corresponding to the actual acceleration, and
evaluating a slip determination function (S8 to S10), from one of a comparison between a theoretical acceleration and the actual acceleration a(DIFF) and a parameter (e.g., torque reserve) corresponding to the comparison between the theoretical acceleration and the actual acceleration; and activating via the electronic transmission control (4) a winter operation mode (S15) when the value (Z) exceeds (Z>Z(IN)) a limit value (Z(IN)).

2. The process according to claim 1, wherein in the step of determining a value by evaluating a slip determination function (S8 to S10), from one of the comparison between the theoretical acceleration and the actual acceleration a(DIFF) and the parameter (e.g., torque reserve) corresponding to the comparison between the theoretical acceleration and the actual acceleration, a value offset (Z(OFF) is determined between the value (Z) with respect to a characteristic line.

3. The process according to claim 1, wherein in the step of determining a first value by evaluating an active ABS deceleration function (S5 to S7), from one of the actual acceleration of the vehicle and the parameter (e.g., gear speed increase) corresponding to the actual acceleration, a value offset (Z(OFF)) is determined between the value (Z) with respect to a characteristic line.

4. The process according to claim 2, wherein an actual value (Z) is calculated from the value (Z) plus the value offset (Z(OFF)) (Z=Z+Z(OFF)).

5. The process according to claim 1, wherein in resetting the driving state to the lower friction value and activated winter operation mode, the meter count (Z) is cyclically decremented (S12).

6. The process according to claim 5, wherein the value is decremented only at a vehicle speed (v) or a parameter (e.g., transmission output speed) corresponding to the vehicle speed and higher than a limit value (GW) (v>GW).

7. The process according to claim 1, wherein the winter operation mode is deactivated (S16) when the value (Z) falls below a switch off value (Z(OFF)) (S16).

8. The process according to claim 1, wherein the winter operation mode is activated by dialing one of several possible winter driving programs in accordance with the inclination of the road.

9. The process according to claim 1, wherein the winter operation mode is deactivated by a positive signal of an anti-slip control system and in case of negative signal the vehicle is either time decelerated or in accordance with distance.

10. The process according to claim 1, wherein the winter operation mode is activated and deactivated by the driver actuating a program selector button.

11. A process for controlling an automatic transmission of a vehicle by an electronic transmission control (4), the process comprising the steps of:

setting a low road friction drive state for the automatic transmission upon detection of one of slip between driven and non-driven gears of the vehicle and active ABS deceleration (ABS=1);

determining a value by one of:
 evaluating an active ABS deceleration function (S5 to S7), from one of an actual acceleration of the vehicle and a parameter (e.g., gear speed increase) corresponding to the actual acceleration, and
 evaluating a slip determination function (S8 to S10), from one of a comparison between a theoretical acceleration and the actual acceleration a(DIFF) and a parameter (e.g., torque reserve) corresponding to the comparison between the theoretical acceleration and the actual acceleration;

determining a value offset (Z(OFF)) between the value (Z) with respect to a characteristic line and an actual value (Z) is calculated from the value (Z) plus the value offset (Z(OFF)) (Z=Z+Z(OFF)); and activating via the electronic transmission control (4) a winter operation mode (S15) when the actual value (Z) exceeds (Z>Z(IN)) a limit value (Z(IN)).

12. A process for determining a low road friction drive state for an automatic transmission of a vehicle by an electronic transmission control (4) based solely on an actual and theoretical acceleration of the vehicle, the process comprising the steps of:

detecting one of slip between driven and non-driven gears of the vehicle and active ABS deceleration (ABS=1);

determining a frictional resistance value by one of:
 evaluating an active ABS deceleration function (S5 to S7), from one of the actual acceleration of the vehicle and a parameter (e.g., gear speed increase) corresponding to the actual acceleration, and
 evaluating a slip determination function (S8 to S10), from one of a comparison between the theoretical acceleration and the actual acceleration a(DIFF) and a parameter (e.g., torque reserve) corresponding to the comparison between the theoretical acceleration and the actual acceleration; and activating via the electronic transmission control (4) a winter operation mode (S15) when the value (Z) exceeds (Z>Z(IN)) a limit value (Z(IN)).

* * * * *